United States Patent
Hac

(10) Patent No.: US 6,658,342 B1
(45) Date of Patent: Dec. 2, 2003

(54) VEHICLE STABILITY CONTROL

(75) Inventor: Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/164,264

(22) Filed: Jun. 5, 2002

(51) Int. Cl.[7] .............................................. G06F 19/00
(52) U.S. Cl. ........................... 701/70; 701/71; 303/140
(58) Field of Search .............................. 701/70, 71, 72, 701/41; 303/140

(56) References Cited

U.S. PATENT DOCUMENTS

| | | | | |
|---|---|---|---|---|
| 5,305,218 A | * | 4/1994 | Ghoneim | 701/72 |
| 6,122,584 A | * | 9/2000 | Lin et al. | 701/70 |

OTHER PUBLICATIONS

John C. Dixon, "*Tires, Suspension and Handling*", Second Edition, Society of Automotive Engineers, Inc., Warrendale, PA., pp. 111–115.

Thomas D. Gillespie, "*Fundamentals of Vehicle Dynamics*", Society of Automotive Engineers, Inc., Warrendale, PA., pp. 210–217.

* cited by examiner

*Primary Examiner*—Marthe Y. Marc-Coleman
(74) *Attorney, Agent, or Firm*—Scott A. McBain

(57) ABSTRACT

A method and computer usable medium, including a program, for vehicle stability control. A rear axle cornering stiffness coefficient in a linear handling range is determined. A first understeer coefficient in a linear handling range is determined. A desired lateral acceleration is determined based on the first understeer coefficient. A second understeer coefficient is determined based on a limited magnitude of the desired lateral acceleration. A desired yaw rate is determined based on the second understeer coefficient. A desired lateral velocity is determined based on the desired yaw rate and the rear axle cornering stiffness coefficient.

20 Claims, 5 Drawing Sheets

VEHICLE STABILITY CONTROL

TECHNICAL FIELD OF THE INVENTION

The present invention relates generally to vehicular stability control. More particularly, the invention relates to a method for enhancing vehicle stability control.

BACKGROUND OF THE INVENTION

In vehicle stability enhancement (VSE) systems, and some other chassis control systems, a significant effort during vehicle tuning may be devoted to the process of characterizing vehicle response in the yaw plane to the steering inputs. This may be accomplished by building look up tables that give steady state values of vehicle yaw rate, and sometimes lateral velocity for various steering angles and vehicle speeds. Since several values of speeds and steering angles have to be considered, the tables involve more than a hundred numbers, each of which has to be determined experimentally. This usually involves several days of testing, which has to be performed on a dry surface, thus being dependent on the weather conditions.

Another drawback of the look up tables is that linear interpolation is used between any two points defined in the table. This may lead to errors when the function approximated by piecewise linear segments is strongly nonlinear. Accordingly, it would be desirable to provide a relatively simple strategy that would permit one to determine the desired values from analytical expressions using vehicle parameter data, which are usually supplied by the vehicle manufacturer. In this way the desired values (of yaw rate and lateral velocity) could be continuously computed, or the look up table values could be determined by running a utility file on a computer. Only limited testing may be needed to verify the correctness of the model.

Therefore, it would be desirable to provide a strategy for enhancing vehicle stability control that overcomes the aforementioned and other disadvantages.

SUMMARY OF THE INVENTION

One aspect of the present invention provides a method of vehicle stability control. A rear axle cornering stiffness coefficient in a linear handling range is determined. A first understeer coefficient in a linear handling range is determined. A desired lateral acceleration is determined based on the first understeer coefficient. A second understeer coefficient is determined based on a limited magnitude of the desired lateral acceleration. A desired yaw rate is determined based on the second understeer coefficient. A desired lateral velocity is determined based on the desired yaw rate and the rear axle cornering stiffness coefficient. The rear axle cornering stiffness coefficient may be determined based on a cross-over lateral velocity. A front axle cornering stiffness coefficient in a linear handling range may be determined. The determined desired yaw rate, desired lateral velocity, and desired lateral acceleration may be transmitted to a vehicle control system.

Another aspect of the invention provides a computer usable medium, including a program, for vehicle stability control. The invention provides computer readable program code for performing the method steps described above.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

The present invention may provide a simple method for determining a desired yaw rate and lateral velocity of vehicle in steady-state as functions of the steering angle, vehicle speed, and several vehicle parameters that are generally known. This could potentially eliminate, or at least greatly simplify, a costly and time-consuming process of experimentally determining the desired values of yaw rate and lateral velocity during vehicle tuning. In some applications, customer handling specifications in terms of the desired understeer coefficient under specific lateral accelerations could be directly translated into the desired values.

Figure 1:
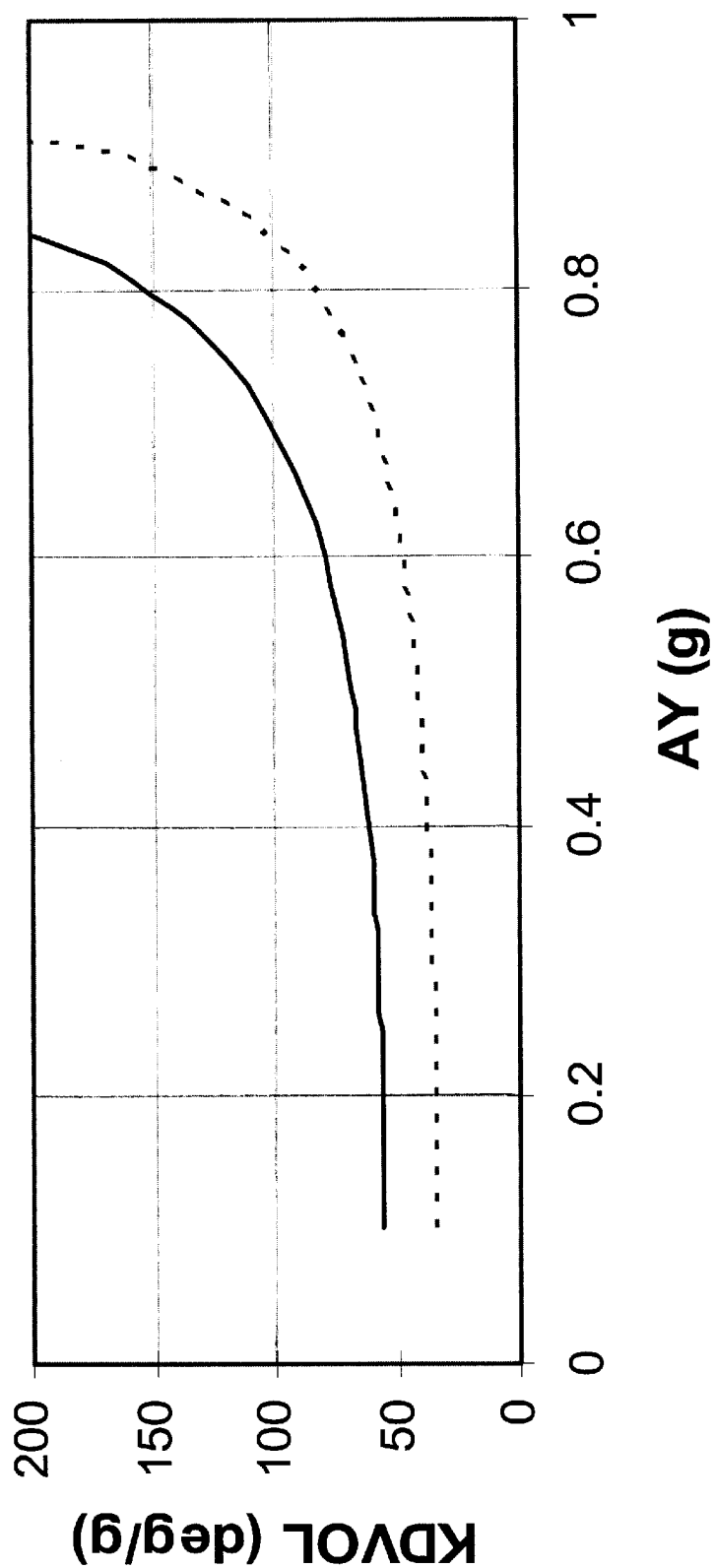
FIG. 1 is a graph of understeer coefficients as functions of lateral acceleration for two sets of suspension parameters.

An example of customer specification in terms of understeer coefficient is provided in FIG. 1. Note that the understeer coefficients in the provided example increase with lateral acceleration. Note also that the understeer coefficients may be significantly affected by suspension tuning, since both curves were determined for vehicle with the same tires but different suspension parameters.

Two principle ideas provided in the following description are: (1) the cornering stiffness coefficients of the front and rear axles may be determined from simple tests, thus representing the entire vehicle influence, including the effects of suspension design; (2) the cornering stiffness coefficients and the understeer coefficient are functions of the desired lateral acceleration, which is a function of steering angle and vehicle speed.

The desired yaw rate and side-slip velocity may be in principle determined from the well-known linear bicycle model, with additional saturation at the limit of adhesion. The linear model yields the following equations for the vehicle yaw rate, $\Omega_d$, lateral acceleration, $a_{yd}$, and lateral velocity, $v_{yd}$:

$$\Omega_{dl} = v_x * \delta / (L + K_{u0} * v_x^2) \tag{1a}$$

$$a_{ydl} = v_x^2 * \delta / (L + K_{u0} * v_x^2) = v_x * \Omega_{dl} \tag{1b}$$

$$v_{ydl} = \Omega_{dl} * [b - M * a * v_x^2 / (C_{r0} * L)] \tag{1c}$$

where $v_x$ is vehicle speed, $\delta$ is the steering angle of the front wheels (which may be computed by multiplying the measured steering wheel angle by the steer gear ratio), L is vehicle wheelbase, $K_{u0}$ is the understeer coefficient in the linear range of handling, b is the distance of the vehicle center of gravity to the rear axle, a is the distance of the vehicle center of gravity to the front axle, M is vehicle mass, and $C_{r0}$ is the cornering stiffness of the rear axle (both tires) in the linear range of handling; the superscript "l" refers to the (steady-state) values obtained from the linear model. Note that according to equation (1c) a vehicle speed $v_x$ exists such that the lateral velocity $v_y$ is identically equal to zero regardless of the steering angle. In order to account for the saturation of the tire forces at the limit of adhesion, the desired values should be saturated at the level corresponding to the maximum lateral acceleration that the vehicle can develop on dry surface, $a_{ymax}$. This yields the following:

$$\Omega_{dl\_lim} = \begin{cases} v_x^* \delta/(L + K_{u0}^* v_x^2) & \text{when } |a_{ydl}| < a_{ymax} \\ a_{ymax}^* sign(\delta)/v_x & \text{when } |a_{ydl}| \geq a_{ymax} \end{cases} \quad (2a)$$

$$v_{ydl\_lim} = \Omega_{dl\_lim}^*[b - M^*a^*v_x^2/(C_{r0}^*L)] \quad (2b)$$

Figure 2:
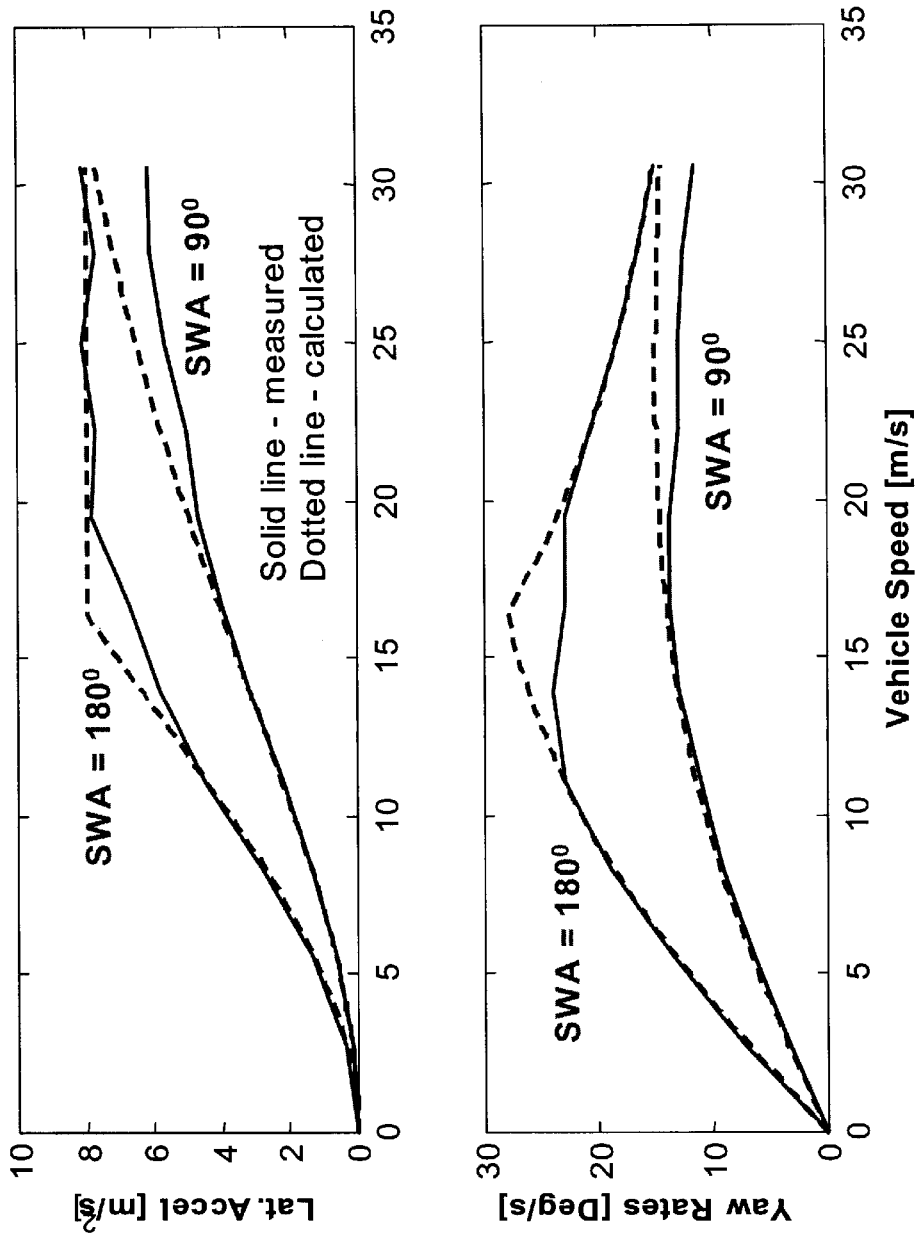
FIG. 2 is a graph of desired lateral acceleration and yaw rates determined from a linear model with saturation.

The desired values of lateral acceleration and yaw rate obtained from the above equations are plotted against the measured values in FIG. 2. The linear model predicts vehicle response very well up to lateral acceleration corresponding to about $0.6^*a_{ymax}$, while the saturation function is quite accurate at the limit of adhesion. In the intermediate range, however, the model may not be accurate.

There are at least two causes for the desired yaw response determined from this simple analytical model to be inaccurate in the nonlinear range of handling. First, it is assumed in the model that both the cornering stiffness of each axle and the understeer coefficient are constants. In reality, the cornering stiffness values and the understeer coefficient may depend on the normal load transfer during cornering, which depends on the lateral acceleration. Thus they are primary functions of lateral acceleration. Secondly, the cornering stiffness values used by the model are often derived from the tire data and the known nominal load.

To improve the accuracy of the model, the cornering stiffness values used in the bicycle model should reflect suspension properties. The proposed approach of the present invention can overcome both problems. The cornering stiffness values and the understeer coefficient may be determined as functions of desired lateral acceleration. The cornering stiffness values in the linear range of handling may be determined from simple vehicle tests, thus reflecting the effects of suspension.

For the linear vehicle model, the understeer coefficient may be determined from the following equation:

$$K_{u0} = M^*(b/C_{f0} - a/C_{r0})/L = M_f/C_{f0} - M_r/C_{r0} \quad (3)$$

where a and b are distances of front and rear axle to the vehicle center of gravity, $C_{f0}$ and $C_{r0}$ are the cornering stiffness of front and rear axle, $M_f=M^*b/L$ and $M_r=M^*a/L$ are the front and rear mass of vehicle. In the linear model, the cornering stiffness values are assumed to be constant. In reality, they depend on the normal load transfer during cornering, which is primarily a function of lateral acceleration. This dependency is the result of the fact that the cornering stiffness per tire depends on the normal tire load. A simple and generally accepted model reflecting this relationship is as follows (Gillespie, 1992; Dixon, 1996):

$$C_y = C_{y0}^*(N/N_0)^*[1 - k^*(\Delta N/N_0)] \quad (4)$$

where $C_y$ and $C_{y0}$ are cornering stiffness of one tire at an actual normal load, N, and at a nominal normal load, $N_0$, respectively. The actual normal load, N, is the sum of $N_0$ and $\Delta N$ wherein $\Delta N$ is the normal load transfer. The constant, k, which may have a typical value of 0.5, is the cornering stiffness sensitivity to normal load. If the load transfer of the left tire of a given axle is $\Delta N$, then load transfer of the right tire is $-\Delta N$. A simple manipulation shows that the cornering stiffness for the given (e.g. front) axle is:

$$C_f = 2^*C_{y0}^*[1 - k^*(\Delta N/N_0)^2] \quad (5)$$

Thus it is a quadratic function of the normal load transfer (a higher order polynomial may be used if more accuracy is desired). Assuming further that the roll moment distribution between front and rear axle is approximately proportional to the mass distribution, the lateral load transfer may be expressed as a function of lateral acceleration:

$$\Delta N/N_0 = (2^*h_{roll}/t_w)^*(a_y/g) \quad (6)$$

where $h_{roll}$ is the height of vehicle center of gravity above the roll axis, $t_w$ is the track width and g is acceleration of gravity. Consequently, the cornering stiffness of the front axle may be expressed as the following function of lateral acceleration:

$$C_f = C_{f0}^*(1 - B_2^*a_y^2) \quad (7)$$

Where $B_2 = k^*[(2^*h_{roll})/(t_w^*g)]^2$. Similarly, $$C_r = C_{r0}^*(1 - B_2^*a_y^2) \quad (8)$$

Figure 3:
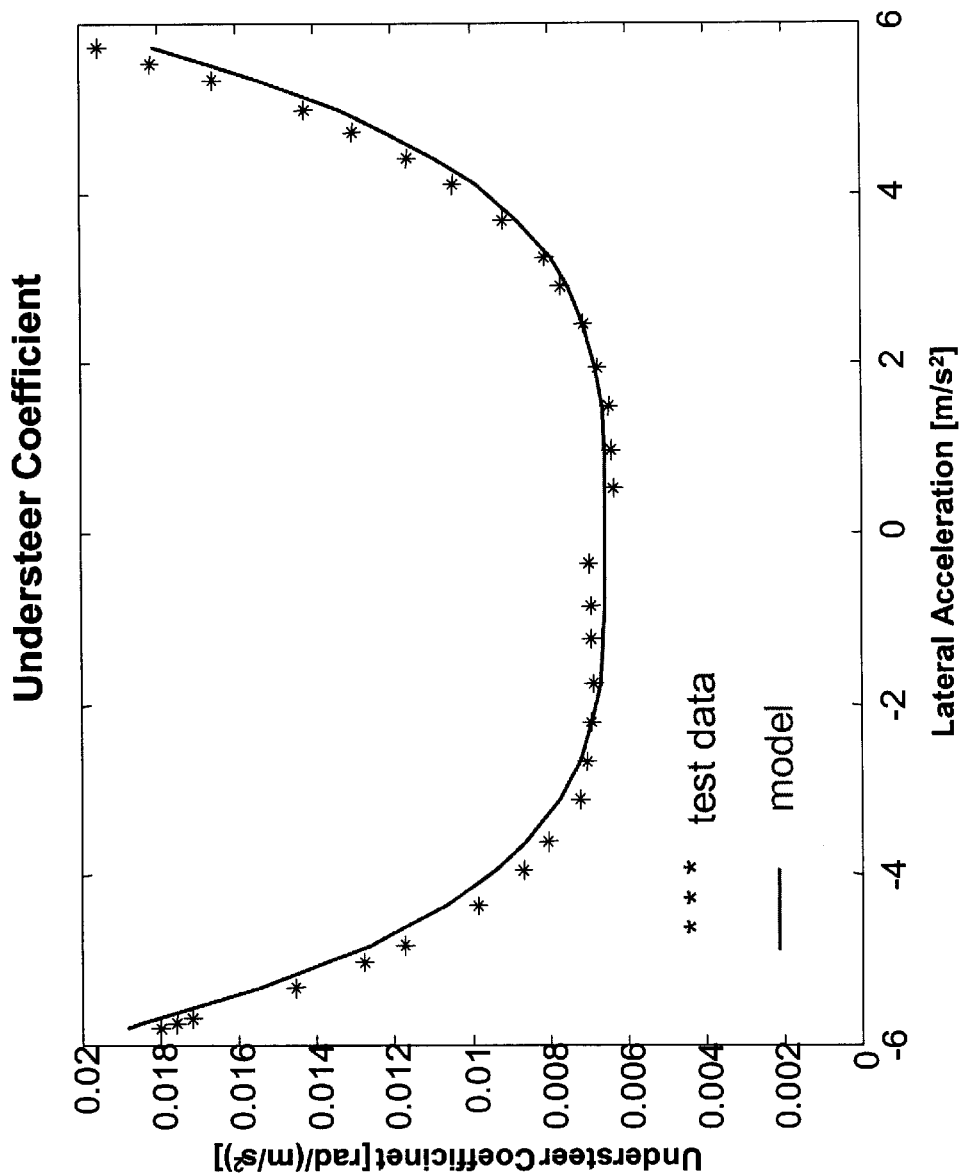
FIG. 3 is a graph of understeer coefficient from test data and a model according to the present invention.

If the roll moment distribution is significantly different from the mass distribution, the coefficient $B_2$ will be somewhat different for the front and rear axle. Substituting equations (7) and (8) into equation (3) yields the following equation after simple manipulation:

$$K_u = K_{u0}^*[1 + B_2^*a_y^2/(1 - B_2^*a_y^2)] \approx K_{u0}^*[1 + B_2^*a_y^2 + B_2^{2*}a_y^4] \quad (9)$$

with $K_{u0}$ given by equation (3). The last equality follows from a Taylor expansion of $1/(1 - B_2^*a_y^2)$ under the assumption that $B_2^*a_y^2$ is significantly less than 1. Thus the understeer coefficient may be represented as a polynomial in the lateral acceleration, $a_y$. An example of the understeer coefficient determined from the vehicle test data supplied by OEM, along with the one computed from equation (9) is shown in FIG. 3. The understeer coefficient may be represented as a polynomial in lateral acceleration and a good fit to the data may be obtained.

The lateral stiffness values for front and rear axles in the linear range of handling, $C_{f0}$ and $C_{r0}$, may be determined as follows. First, the understeer coefficient in the linear range of handling, $K_{u0}$, may be determined experimentally. Usually, this value is provided by a vehicle manufacturer. This supplies the first equation, (3). The second equation may be obtained by experimentally determining the velocity at which vehicle side slip velocity is zero regardless of the steering angle (provided that vehicle remains in the linear range of handling). According to equation (1c), this characteristic velocity is:

$$v_{x0}^2 = b^*C_{r0}/M_r \quad (10)$$

$M_r = M^*a/L$ is as defined previously (M is the total vehicle mass, a is the distance from center of gravity to the front axle, and L is the wheelbase). Solving equations (3) and (10) for the cornering stiffness coefficients, $C_{f0}$ and $C_{r0}$, yields:

$$C_{r0} = M_r^*v_{x0}^2/b; \quad C_{f0} = M_f^*v_{x0}^2/(b + K_{u0}^*v_{x0}^2) \quad (11)$$

The desired values of yaw rate and lateral velocity may now be computed from the equations (1a) and (1c), in which the understeer coefficient and rear cornering stiffness for the linear handling range, $K_{u0}$ and $C_{r0}$, are replaced by the nonlinear functions given by equations (8) and (9), respectively. It may be desirable, however, that the desired values of yaw rate and lateral velocity be dependent only on steering angle, $\delta$, and vehicle speed, $v_x$. This may be achieved when the actual lateral acceleration is replaced by the desired lateral acceleration obtained from the linear equation (1b), subjected to the suitable limitation. As a result, the understeer coefficient and the cornering stiffness become functions of steering angle and speed, but not of lateral acceleration. Since the desired lateral acceleration is larger than the actual value in the nonlinear range of handling, the coefficient $B_2$ in equations (8) and (9) may be reduced somewhat when ay is replaced by $a_{ydl\_lim}$ (the desired lateral acceleration obtained from the linear model, equation 1b, but with the magnitude limited to $a_{ymax}$). Good results may be obtained by neglecting the 4-th order term in calculation of $K_u$ using $a_{ydl\_lim}$.

By substituting the understeer coefficient, $K_u$, and the rear axle cornering stiffness coefficient, $C_r$ (both coefficients being functions of steering angle $\delta$ and speed $v_x$) in place of $K_{u0}$ and $C_{r0}$ (which are constant) in equations (2a) and (2b), the desired values of yaw rate, $\Omega_d$, and lateral velocity, $v_{yd}$, may be obtained. These desired values are the steady-state values, which describe vehicle response when both vehicle speed and the steering angle are constant or slowly-varying functions of time. For some vehicle stability enhancement systems, these values can be used as desired values. In other systems, there may be a need to represent vehicle dynamic response more accurately to better characterize the desired vehicle response during quick transient maneuvers; the process of obtaining the desired values from the steering angle and speed is sometimes referred to as a driver command interpreter.

Vehicle response in the yaw plane may be modeled as a velocity-dependent second order system, characterized by an undampened natural frequency and damping ratio. Both of these parameters are functions of vehicle speed. The parameters also (according to the linear handling model) directly depend on vehicle parameters, such as distances, mass, moment of inertia (about yaw axis), and cornering stiffness coefficients. Using the second order model, vehicle dynamic response may be obtained from the steady state values. For example, the relationship between the steady-state values and the dynamic values of yaw rate, lateral velocity, and lateral acceleration and the corresponding dynamic values in the Laplace domain may be described as follows:

$$\Omega_{d\_dyn}(s)=\Omega_d*(1+T_\Omega s)/[1+(2*\zeta/\omega_n)*s+(1/\omega_n^2)*s^2] \quad (12a)$$

$$v_{yd\_dyn}(s)=\Omega_d*(1+T_{vy}s)/[1+(2*\zeta/\omega_n)*s+(1/\omega_n^2)*s^2] \quad (12b)$$

$$a_{yddyn}=s*v_{yd\_dyn}(s)+v_x*\Omega_{d\_dyn}(s) \quad (12c)$$

where $\omega_n$ is the undampened natural frequency, $\zeta$ is the damping ratio, and s is the Laplace operand. The above equations may be written in a time domain as differential or difference equations and implemented in a microprocessor (in a manner known to those skilled in art) to generate the dynamic values from the steady state values.

The parameters of the dynamic filters used in a driver command interpreter may now be determined as functions of the nonlinear cornering stiffness parameters. The undampened natural frequency, $\omega_n$, and the damping ratio, $\zeta$, of the second order filter reflecting vehicle dynamics in the yaw plane may be expressed as follows:

$$\omega_n^2=(C_f*C_r*L^2)/(M*I_{zz}*v_x^2)+(C_r*b-C_f*a)/I_{zz} \quad (13)$$

$$\zeta=[(C_f+C_r)/M+(C_f*a^2+C_r*b^2)/I_{zz}]/(2*v_x^2*\omega_n^2) \quad (14)$$

where $I_{zz}$ is the moment of vehicle inertia about the yaw (vertical) axis passing through the center of gravity and $C_f$ and $C_r$ are computed from equations (8) with ay replaced by $a_{ydl\_lim}$.

A system for implementing the method and computer usable medium according to the present invention may include a variety of commercially available vehicle components. As recognized in the art, commercially available sensors may provide vehicle velocity, steering angle (front and rear), and other pertinent information. The vehicle manufacturer may provide such information as vehicle mass, wheelbase, understeer coefficient in the linear range of handling, and the like. Hydraulic or electrical drives may actuate parameters for braking control, suspension control, steering of front and rear wheels, and other stability control (sub)systems. The methods and determinations (e.g., calculations), including those based on equations, may be performed by a device such as a microprocessor. The microprocessor may receive input, perform calculations, and transmit output to a vehicle control system for controlling the drive(s) and, consequently, for enhancing vehicle stability. Furthermore, computer usable medium including programs, equations, and associated values may be programmed in a microprocessor memory portion (e.g., ROM, RAM, and the like) for executing functions associated with the present invention.

Figure 4:
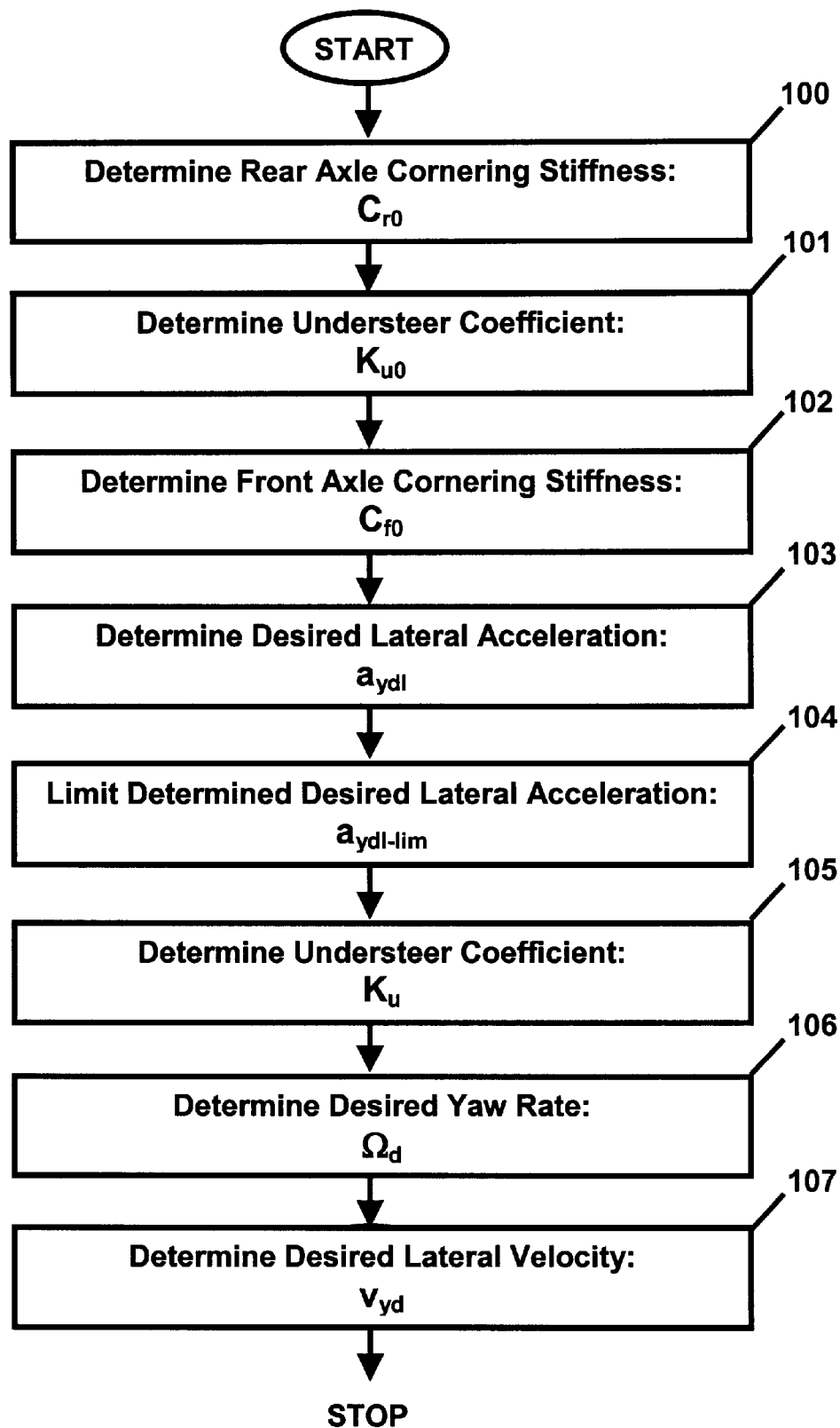
FIG. 4 is a flow chart of a vehicle stability control algorithm made in accordance with the present invention.

FIG. 4 is a flow chart of a vehicle stability control algorithm made in accordance with the present invention. The algorithm may begin by determining a cornering stiffness of the rear axle in a linear handling range (step 100). The rear axle cornering stiffness, $C_{r0}$, may be calculated from the following equation (equation 11):

$$C_{r0}=M_r*v_{x0}^2/b$$

where $M_r$ is a rear vehicle mass ($M_r=M*a/L$, where M is total vehicle mass, a is distance of front axle to center of gravity, L is wheelbase), b is a distance of vehicle center of gravity to the rear axle, and $v_{x0}$ is a cross-over lateral velocity at which the side slip velocity is zero regardless of the steering angle (in the linear range of handling).

A first understeer coefficient in the linear handling is determined (step 101). The first understeer coefficient, $K_{u0}$, is usually provided by the manufacturer; if not, it may be determined experimentally as known in the art.

A cornering stiffness of the front axle may be determined (step 102). The front axle cornering stiffness, $C_{f0}$, may be calculated from the equation (equation 11):

$$C_{f0}=M_f*v_{x0}^2/(b+K_{u0}*v_{x0}^2)$$

where $M_f$ is a front mass of vehicle and $K_{u0}$ is the first understeer coefficient in the linear range of handling.

A desired lateral acceleration is determined based on the first understeer coefficient (step 103). The desired lateral acceleration, $a_{ydl}$, may be calculated from the following simplified equation (equation 1b):

$$a_{ydl}=v_x^2*\delta/(L+K_{u0}*v_x^2)$$

where $v_x$ is vehicle speed, $\delta$ is steering angle at the front wheels, and L is vehicle wheelbase.

The value of the desired lateral acceleration, $a_{ydl}$, may then be limited to the maximum lateral acceleration that the vehicle can develop on dry surface, $a_{ymax}$ (step 104). This yields $a_{ydl\_lim}$.

A second understeer coefficient is determined based on the limited desired lateral acceleration (step 105). The understeer coefficient, $K_u$, may be calculated from the equation:

$$K_u = K_{u0}*(1 + B_2*a_{ydl\_lim}^2)$$

The polynomial coefficient, $B_2$, may be determined by the equation:

$$B_2 = k*[(2*h_{roll})/(t_w*g)]$$

where k is the sensitivity coefficient of tire lateral stiffness to normal load, $h_{roll}$ is height of vehicle center of gravity above the roll axis, $t_w$ is track width, and g is gravitational acceleration.

A desired yaw rate is determined based on the second understeer coefficient (step 106). The desired yaw rate, $\Omega_d$, may be calculated from the equation:

$$\Omega_d = \begin{cases} v_x^\delta/(L + K_u^v_x^2) & \text{when } |a_{ydl\_lim}| < a_{ymax} + \Delta a_y \\ a_{ymax}^**sign(\delta)/v_x & \text{when } a_{ydl\_lim}| \geq a_{ymax} + \Delta a_y \end{cases}$$

where the lateral acceleration value, $\Delta a_y$, may be an incremental value of about 1 m/s².

A desired lateral velocity is determined based on the desired yaw rate and the rear axle cornering stiffness coefficient (step 107). The desired lateral velocity, $v_{yd}$, may be calculated from the equation:

$$v_{yd} = \Omega_d*[b - M*v_x^2/(C_r*L)]$$

where $C_r = C_{r0}*(1 - B_2*a_{ydl\_lim}^2)$. M is the total mass of vehicle.

As an additional step, the parameters of the dynamic filters may be determined if desired from equations (13) and (14).

Figure 5:
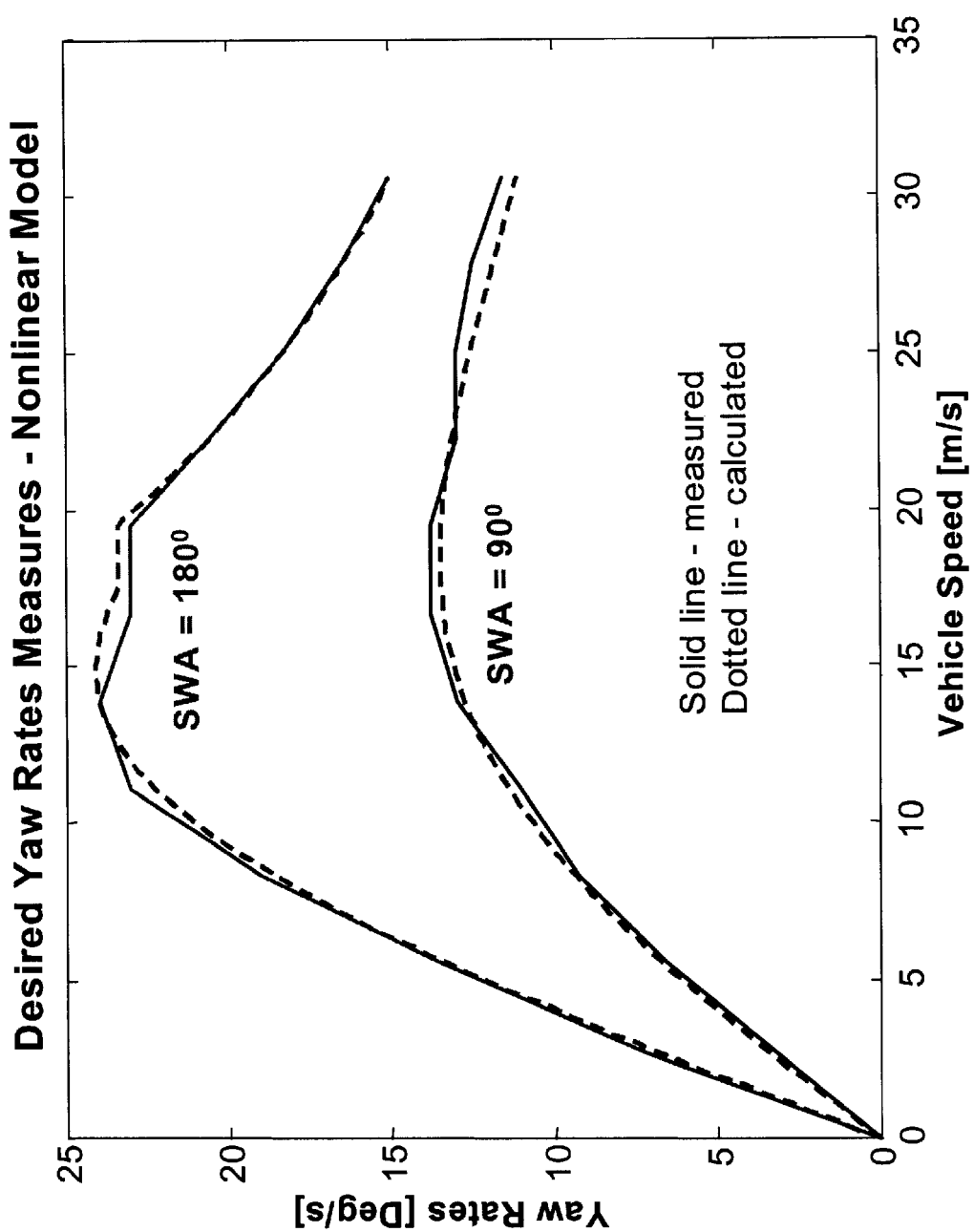
FIG. 5 is a graph of vehicle yaw rate from test data and a model according to the present invention.

In FIG. 5, the desired yaw rate determined using the disclosed method is compared to the measured yaw rate. The differences are within 2 deg/s, which is within measurement errors. The described method may permit analytical determination of the desired values from known parameters with minimal effort. The model may capture major nonlinearities in vehicle handling. Additional testing may be reduced to a minimum to verify the results. The method may also be applied to vehicles with active rear steer; in this case the front steering angle, $\delta$, in steps 103 and 106 (see FIG. 4) may be replaced by the difference $(\delta_f - \delta_r)$, where $\delta_f$ is the steer angle of the front wheels and $\delta_r$ of the rear wheels.

Determining the desired yaw rate and lateral velocity/acceleration according to the present invention may provide enhanced vehicle stability control. In one embodiment, the determined desired yaw rate and lateral velocity/acceleration may be calculated by the microprocessor and then transmitted to the vehicle control system. In another embodiment, a look up table may be generated by a utility file based on the described algorithm and implemented on a computer. The vehicle control system may access the look up table as necessary. The vehicle control system may use the values determined by the microprocessor and/or look up tables to manage stability control. The vehicle control system may actuate brake control, rear steering angle, suspension characteristics, and the like to achieve enhanced stability. For example, the vehicle control system may use the determined yaw rate and lateral velocity/acceleration information to actuate hydraulic or electrical drives thereby controlling rear wheel steering.

The determinations may be achieved without the need for value tables. As such, linear interpolation need not be used between any two points defined in the table. This may avoid any errors for when the function approximated by piecewise linear segments is strongly nonlinear. In addition, the determinations could potentially eliminate, or at least greatly simplify, the process of experimentally determining the desired values of yaw rate and lateral velocity during vehicle tuning.

While the embodiments of the invention disclosed herein are presently considered to be preferred, various changes and modifications may be made without departing from the spirit and scope of the invention. For example, the described algorithm and calculations are not limited to any particular method sequence or equation. Specifically, values may be determined by a variety of strategies or equations. The disclosed equations may be exemplary of only a subset of equations useful for such determinations. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method of vehicle stability control, comprising;

determining a rear axle cornering stiffness coefficient in a linear handling range;

determining a first understeer coefficient in a linear handling range;

determining a desired lateral acceleration based on the first understeer coefficient;

determining a second understeer coefficient based on a limited magnitude of the desired lateral acceleration;

determining a desired yaw rate based on the second understeer coefficient; and determining a desired lateral velocity based on the desired yaw rate and the rear axle cornering stiffness coefficient.

2. The method of claim 1 wherein the rear axle cornering stiffness coefficient is determined based on a cross-over lateral velocity.

3. The method of claim 1 wherein the second understeer coefficient is determined in accordance with the equation:

$$K_u = K_{u0}*(1 + B_2*a_{ydl\_lim}^2)$$

where $K_{u0}$ is the first understeer coefficient in the linear handling range, $B_2$ is a polynomial coefficient, and $a_{ydl\_lim}$ is the desired lateral acceleration limited to maximum lateral acceleration.

4. The method of claim 3 wherein the polynomial coefficient, $B_2$, is determined in accordance with the equation:

$$B_2 = k*[(2*h_{roll})/(t_w*g)]^2$$

where k is a tire sensitivity coefficient to a normal load, $h_{roll}$ is a height of vehicle center of gravity above a roll axis, $t_w$ is a track width value, and g is a gravitational acceleration constant.

5. The method of claim 1 wherein the desired yaw rate is determined in accordance with the equation:

$$\Omega_d = \begin{cases} v_x^*\delta/(L+K_u^*v_x^2) & \text{when } |a_{ydl\_lim}| < a_{ymax} + \Delta a_y \\ a_{ymax}^*sign(\delta)/v_x & \text{when } |a_{ydl\_lim}| \geq a_{ymax} + \Delta a_y \end{cases}$$

where $v_x$ is a vehicle speed, $\delta$ is a front wheel steering angle, L is a vehicle wheelbase, $K_u$ is the second understeer coefficient, $a_{ydl\_lim}$ is the desired lateral acceleration limited to maximum lateral acceleration, $a_{ymax}$ is a maximum lateral acceleration of the vehicle on a dry surface, and $\Delta a_y$ is lateral acceleration value.

6. The method of claim 5 wherein the lateral acceleration value, $\Delta a_y$, is an incremental value of about 1 m/s².

7. The method of claim 1 wherein the desired lateral velocity is determined in accordance with the equation:

$$v_{yd} = \Omega_d*[b - M*v_x^2/(C_r*L)]$$

where $\Omega_d$ is the desired yaw rate, b is a distance of vehicle center of gravity to the rear axle, M is a vehicle mass, $v_x$ is a vehicle speed, $C_r$ is a calculated rear axle cornering stiffness, and L is a vehicle wheelbase.

8. The method of claim 7 wherein the calculated rear axle cornering stiffness, $C_r$, is determined in accordance with the equation:

$$C_r = C_{r0}*(1 - B_2*a_{ydl\_lim}^2)$$

where $C_{r0}$ is the rear axle cornering stiffness in the linear handling range, $B_2$ is a polynomial coefficient, and $a_{ydl\_lim}$ is the desired lateral acceleration limited to maximum lateral acceleration.

9. The method of claim 1 further comprising determining a front axle cornering stiffness coefficient in a linear handling range.

10. The method of claim 1 further comprising transmitting at least one of the determined desired yaw rate, desired lateral velocity, and desired lateral acceleration to a vehicle control system.

11. A computer usable medium including a program for vehicle stability control, comprising;
   computer readable program code for determining a rear axle cornering stiffness coefficient in a linear handling range;
   computer readable program code for determining a first understeer coefficient in a linear handling range;
   computer readable program code for determining a desired lateral acceleration based on the first understeer coefficient;
   computer readable program code for determining a second understeer coefficient based on a limited magnitude of the desired lateral acceleration;
   computer readable program code for determining a desired yaw rate based on the second understeer coefficient; and
   computer readable program code for determining a desired lateral velocity based on the desired yaw rate and the rear axle cornering stiffness coefficient.

12. The computer usable medium of claim 11 wherein the rear axle cornering stiffness coefficient is determined based on a cross-over lateral velocity.

13. The computer usable medium of claim 11 wherein the second understeer coefficient is determined in accordance with the equation:

$$K_u = K_{u0}*(1 + B_2*a_{ydl\_lim}^2)$$

where $K_{u0}$ is the first understeer coefficient in the linear handling range, $B_2$ is a polynomial coefficient, and $a_{ydl\_lim}$ is the desired lateral acceleration limited to maximum lateral acceleration.

14. The computer usable medium of claim 13 wherein the polynomial coefficient, $B_2$, is determined in accordance with the equation:

$$B_2 = k*[(2*h_{roll})/(t_w*g)]^2$$

where k is a tire sensitivity coefficient to a normal load, $h_{roll}$ is a height of vehicle center of gravity above a roll axis, $t_w$ is a track width value, and g is a gravitational acceleration constant.

15. The computer usable medium of claim 11 wherein the desired yaw rate is determined in accordance with the equation:

$$\Omega_d = \begin{cases} v_x^*\delta/(L+K_u^*v_x^2) & \text{when } |a_{ydl\_lim}| < a_{ymax} + \Delta a_y \\ a_{ymax}^*sign(\delta)/v_x & \text{when } |a_{ydl\_lim}| \geq a_{ymax} + \Delta a_y \end{cases}$$

where $v_x$ is a vehicle speed, $\delta$ is a front wheel steering angle, L is a vehicle wheelbase, $K_u$ is the second understeer coefficient, $a_{ydl\_lim}$ is the desired lateral acceleration limited to maximum lateral acceleration, $a_{ymax}$ is a maximum lateral acceleration of the vehicle on a dry surface, and $\Delta a_y$ is lateral acceleration value.

16. The computer usable medium of claim 15 wherein the lateral acceleration value, $\Delta a_y$, is an incremental value of about 1 m/s².

17. The computer usable medium of claim 11 wherein the desired lateral velocity is determined in accordance with the equation:

$$v_{yd} = \Omega_d*[b - M*v_x^2/(C_r*L)]$$

where $\Omega_d$ is the desired yaw rate, b is a distance of vehicle center of gravity to the rear axle, M is a vehicle mass, $v_x$ is a vehicle speed, $C_r$ is a calculated rear axle cornering stiffness, and L is a vehicle wheelbase.

18. The computer usable medium of claim 17 wherein the calculated rear axle cornering stiffness, $C_r$, is determined in accordance with the equation:

$$C_r = C_{r0}*(1 - B_2*a_{ydl\_lim}^2)$$

where $C_{r0}$ is the rear axle cornering stiffness in the linear handling range, $B_2$ is a polynomial coefficient, and $a_{ydl\_lim}$ is the desired lateral acceleration limited to maximum lateral acceleration.

19. The computer usable medium of claim 11 further comprising determining a front axle cornering stiffness coefficient in a linear handling range.

20. The computer usable medium of claim 11 further comprising transmitting at least one of the determined desired yaw rate, desired lateral velocity, and desired lateral acceleration to a vehicle control system.

\* \* \* \* \*